US012045455B2

(12) United States Patent
Lane et al.

(10) Patent No.: US 12,045,455 B2
(45) Date of Patent: *Jul. 23, 2024

(54) MODIFYING SCROLLING BEHAVIOR WITH COMPETING CONSTRAINT PRIORITIES IN LANDSCAPE AND PORTRAIT MODES

(71) Applicant: Intuit Inc., Mountain View, CA (US)

(72) Inventors: Jerome Parker Lane, Mountain View, CA (US); Cindy Chen, Mountain View, CA (US); Jing Jing Wu, Mountain View, CA (US); Bill Clarke, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/072,635

(22) Filed: Nov. 30, 2022

(65) Prior Publication Data
US 2023/0409183 A1 Dec. 21, 2023

Related U.S. Application Data

(63) Continuation of application No. 17/842,721, filed on Jun. 16, 2022, now Pat. No. 11,604,577.

(51) Int. Cl.
*G06F 3/0485* (2022.01)
*G06F 3/04886* (2022.01)

(52) U.S. Cl.
CPC ........ *G06F 3/0485* (2013.01); *G06F 3/04886* (2013.01)

(58) Field of Classification Search
None
See application file for complete search history.

(56) References Cited

U.S. PATENT DOCUMENTS

| | | | |
|---|---|---|---|
| 5,317,306 A | 5/1994 | Abraham et al. | |
| 5,434,964 A | 7/1995 | Moss et al. | |
| 7,441,204 B2 | 10/2008 | Thomson et al. | |
| 9,129,550 B2 | 9/2015 | Doll | |
| 10,324,526 B2 | 6/2019 | Sullivan et al. | |
| 10,831,358 B2 | 11/2020 | Webber | |
| 10,866,719 B1 | 12/2020 | Bulusu et al. | |
| 2012/0240055 A1 | 9/2012 | Webber | |
| 2013/0187903 A1 | 7/2013 | Papageorgiou et al. | |

*Primary Examiner* — Henry Orr
(74) *Attorney, Agent, or Firm* — Lathrop GPM LLP

(57) ABSTRACT

A method including receiving a command to display a modal dialog. The modal dialog is displayed using both first and second scrolling frames. The first scrolling frame permits scrolling when a modal dialog height exceeds a first scrolling frame constraint. The second scrolling frame permits scrolling of a content section when a content section height exceeds a second scrolling frame constraint. The first scrolling frame constraint has a first and second priorities. The second scrolling frame constraint has a third priority. An orientation of the display screen is determined as being either in a portrait orientation or a landscape orientation. Responsive to determining the physical orientation, an applicable priority that is applicable to the first scrolling frame constraint is assigned. The applicable priority is the first priority in the portrait orientation, and is the second priority in the landscape orientation. After assigning the applicable priority, the modal dialog is displayed.

20 Claims, 9 Drawing Sheets

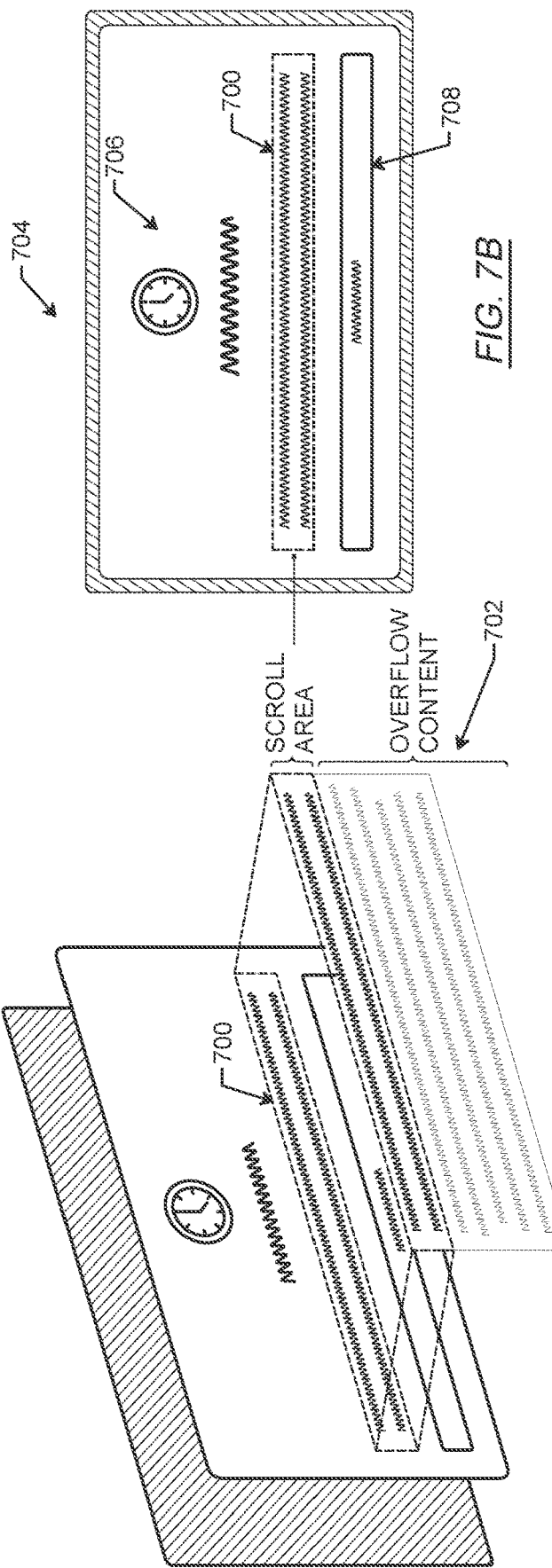

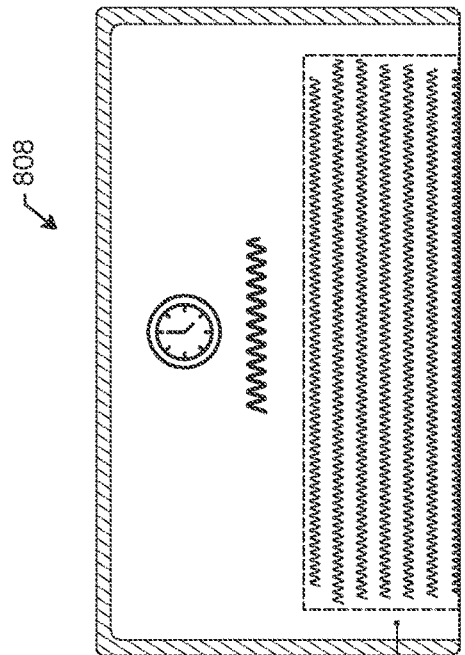
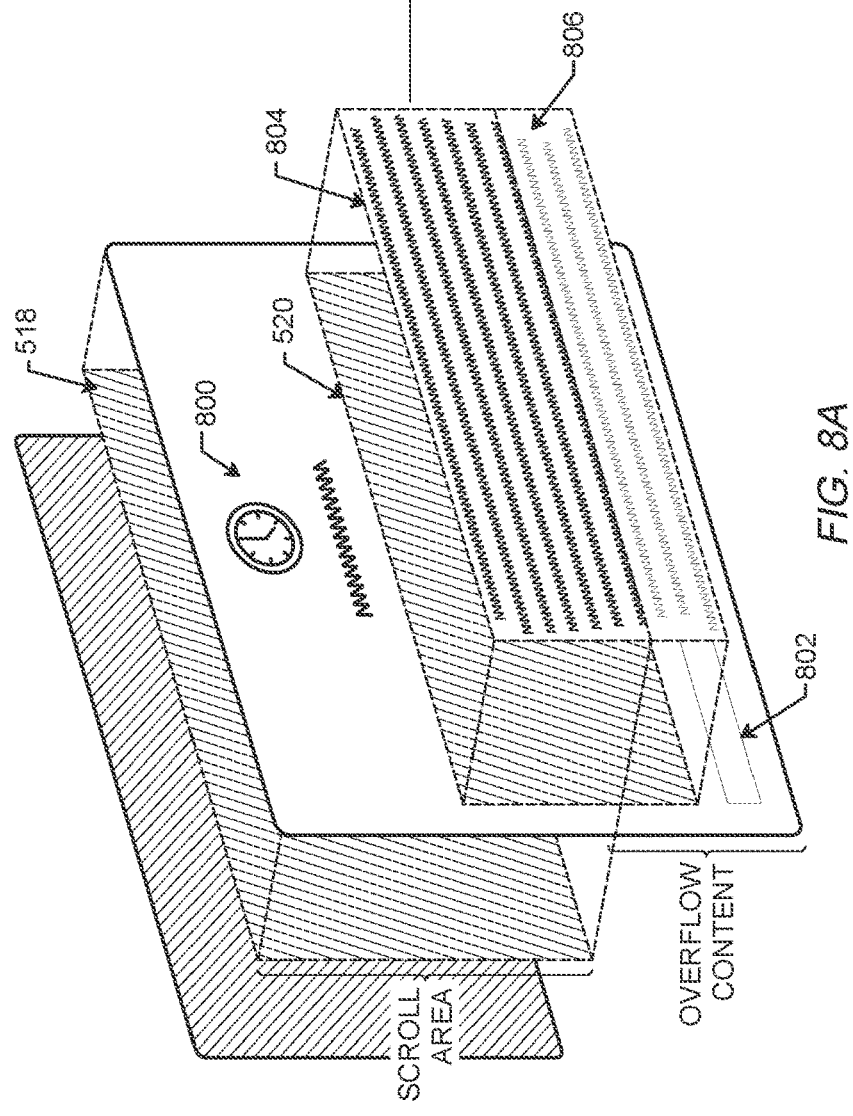
FIG. 8A
FIG. 8B

MODIFYING SCROLLING BEHAVIOR WITH COMPETING CONSTRAINT PRIORITIES IN LANDSCAPE AND PORTRAIT MODES

BACKGROUND

Screen sizes limit the amount of information that may be displayed from one or more documents at any given time. Mobile devices (e.g., mobile phones) and tablets especially may have difficulty displaying a desirable amount of information from one or more documents at any given time.

SUMMARY

The one or more embodiments include a method including receiving a command to display a modal dialog on a display screen of a device. The display screen is programmed to display the modal dialog using both a first scrolling frame and a second scrolling frame. The first scrolling frame permits scrolling of the modal dialog when a modal dialog height exceeds a first scrolling frame constraint of the first scrolling frame. The second scrolling frame permits scrolling of a content section of the modal dialog when a content section height exceeds a second scrolling frame constraint of the second scrolling frame. The first scrolling frame constraint has a first priority and a second priority. The second scrolling frame constraint has a third priority. The method also includes determining a physical orientation of the display screen as being either in a portrait orientation or a landscape orientation. The method also includes assigning, responsive to determining the physical orientation, an applicable priority that is applicable to the first scrolling frame constraint. The applicable priority is the first priority in the portrait orientation, and is the second priority in the landscape orientation. The method also includes displaying, after assigning the applicable priority, the modal dialog on the display screen.

The one or more embodiments also include a system including a display screen and a data repository connected to the display screen. The data repository stores a modal dialog displayable on a display screen of a device. the modal dialog having a modal dialog height. The modal dialog further includes a first section and a content section having a content section height. The data repository also stores a first scrolling frame defined for the modal dialog and defining a first scrolling behavior of the modal dialog. The data repository also stores a second scrolling frame defined for the modal dialog and defining a second scrolling behavior of the modal dialog. The data repository also stores a first constraint defined for the first scrolling frame. The data repository also stores a second constraint defined for the second scrolling frame. The data repository also stores a first priority and a second priority assignable to the first constraint. The data repository also stores an applicable priority that is one of the first priority and the second priority. The data repository also stores a third priority assigned to the second constraint. The data repository also stores a determination of whether the display screen is in the portrait orientation or in the landscape orientation. The system also includes a controller connected to the data repository and configured to perform, in response to receiving a command to display the modal dialog, generating the determination of whether the display screen is in the portrait orientation or in the landscape orientation. The controller is further configured to perform assigning, based on the determination, one of the first priority and the second priority as the applicable priority. The controller is further configured to perform displaying, on the display screen, the modal dialog.

The one or more embodiments also include a method of programmatically controlling scrolling behavior of a modal dialog when the modal dialog is displayed on a display screen of a device. The method includes establishing a first scrolling frame for the modal dialog, the first scrolling frame having a first constraint and defining a first scrolling behavior of the modal dialog. The method also includes establishing a second scrolling frame for the modal dialog, the second scrolling frame having a second constraint and defining a second scrolling behavior of the modal dialog. The second scrolling frame is nested with respect to the first scrolling frame. The method also includes establishing a first priority for the first constraint when the display screen is in a portrait orientation. The method also includes establishing a second priority for the first constraint when the display screen is in a landscape orientation. The method also includes establishing a third priority for the second constraint. The third priority is less than the first priority. The second priority is less than the third priority. The method also includes programming generation of a command to change an applicable priority of the first constraint between the first priority and the second priority, responsive to detection of a change in orientation of the display screen between the portrait orientation and the landscape orientation.

Other aspects of the one or more embodiments will be apparent from the following description and the appended claims.

BRIEF DESCRIPTION OF DRAWINGS

FIG. 4A, FIG. 4B, FIG. 5, FIG. 6A, FIG. 6B, FIG. 7A, FIG. 7B, FIG. 8A, and FIG. 8B show examples of modifying scrolling behavior with competing constraint priorities in landscape and portrait modes, in accordance with one or more embodiments.

DETAILED DESCRIPTION

Figure 1:
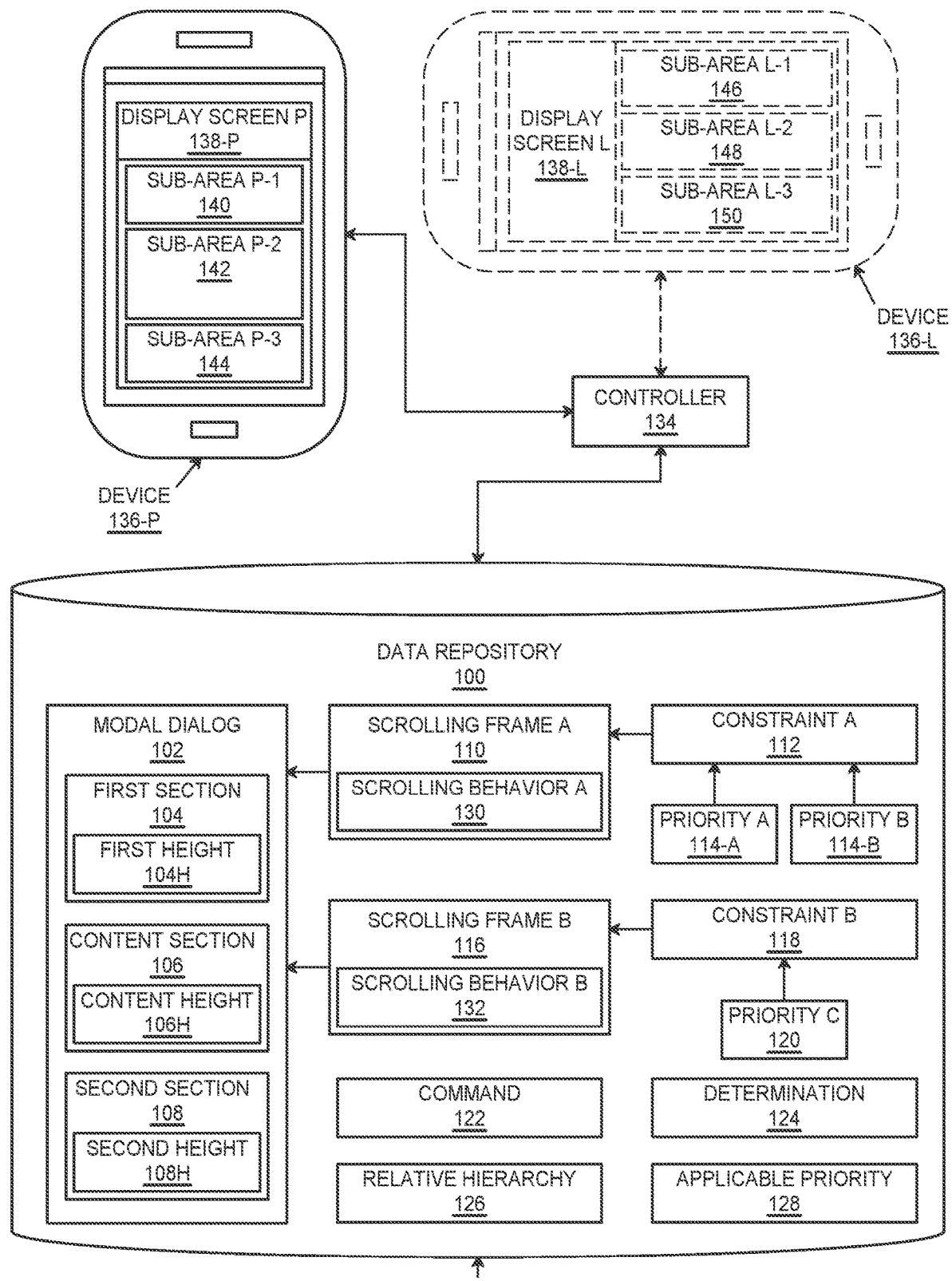
FIG. 1 shows a computing system, in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

In general, the one or more embodiments relate to improved graphical user interfaces (GUIs), particularly with respect to devices that have small screens relative to desktop computers and many laptop computers. As indicated above, mobile devices (e.g., mobile phones) and tablets, especially, may have difficulty displaying a desirable amount of information from one or more documents at any given time. The physical screen size of some tablets and many mobile phones thus poses a challenge to displaying a desired amount of information on the screen.

While the one or more embodiments may be used to display many different types of information, the one or more embodiments are particularly useful with respect to the display of modal dialogs. As defined further below, a modal dialog is a document that is divided into multiple sections, with some sections displayed differently on the GUI. For example, a modal dialog may have one or more sections that remain frozen when displayed on a screen, and one or more other sections that allows a user to scroll through a document. See FIG. 4A through FIG. 8B for examples of modal dialogs.

A particular GUI challenge arises with respect to modal dialogs displayed on mobile devices that are physically longer in one dimension than in another, such as is the case with many mobile phones. Such devices may be referred to as elongated devices. An elongated device may display information differently depending on how the elongated device is physically oriented. Specifically, the elongated device may display information in a "portrait" mode when the longer portion of the elongated device is pointed roughly upwardly or downwardly with respect to the direction of gravity. The elongated device also may display information in a "landscape" mode when the longer portion of the elongated devices is pointed roughly horizontally with respect to the direction of gravity. Examples of portrait mode and landscape mode are shown in FIG. 1 and FIG. 4A through FIG. 8B. The particular challenge that may arise is that, in landscape mode, the frozen sections of the GUI take up so much physical screen space that the scrolling portions of the screen are too small to be useful or desirable for a user.

The one or more embodiments solve the above-described challenge by modifying scrolling behavior using competing priorities for the constraints controlling the heights of multiple scrolling frames in both landscape and portrait modes. Specifically, the one or more embodiments use multiple nested scrolling frames (defined below) and a system of constraints such that the height of nested scrollable areas is constrained to attempt to equal the height of their respective content. In cases where all of the content will not fit on the screen, in either portrait or landscape mode, the height constraints of the scrolling frames compete with one another. The relative priorities of the constraints controlling the heights of scrolling frames are adjusted when the display mode is changed from portrait to landscape, and vice versa. As a result, the most favorable scrolling behavior for the selected display mode is presented to the user, regardless of which mode the user engages.

For example, the operational result of the one or more embodiments may be that, in portrait mode, the modal dialog displays two frozen sections and allows scrolling of a content section between them. However, when the mobile device is switched to landscape mode, then the entire modal dialog, including the two sections that were previously frozen, now scrolls. Thus, the user never contends with a scrolling section of the GUI that is too small to manipulate or to use without undue user frustration.

The one or more embodiments distinguish between a "screen" and a graphical user interface (a "GUI"). A "screen" is a physical device that is used to generate an image. A screen also may be referred to as a "display screen," a "display," or a "display device." A "touch screen" is a screen that is configured to receive commands via the user physically touching or otherwise physically interacting with the screen.

In turn, the GUI is one or more images, usually organized to present an overall image, that is displayed on the screen. One or more computer programs (i.e., software or application-specific hardware), when executed, command the GUI to be displayed on the screen. The user may interact with, or receive information from, the GUI. For example, the GUI may include a "widget." A widget is an interactive area on the GUI which may be used to receive user commands. Widgets may take the form of buttons, drop-down menus, dialog boxes, etc. The GUI may include display of a modal dialog, which may include one or more widgets, one or more content sections, or other sections.

Attention is now turned to the figures. FIG. 1 shows a computing system, in accordance with one or more embodiments. The computing system includes a data repository (100). In one or more embodiments, the data repository (100) is a storage unit and/or device (e.g., a file system, database, collection of tables, or any other storage mechanism) for storing data. Further, the data repository (100) may include multiple different storage units and/or devices. The multiple different storage units and/or devices may or may not be of the same type and may or may not be located at the same physical site.

The data repository (100) stores a modal dialog (102). The modal dialog (102) is one or more documents displayable on a GUI. The modal dialog (102) includes one or more sections, such as for example First Section (104), Content Section (106), and Second Section (108). A section is a document, or a portion of a document, that forms at least part of the modal dialog (102). The sections may be displayed differently on the GUI. More or fewer sections may be present.

For example, the modal dialog (102) may be a user license agreement together with an "accept" widget, a "reject" widget, and a company logo. In this example, the First Section (104) is the company logo, which is displayed on a top sub-area of a screen. The Content Section (106) is the text of the user license agreement, which is displayed in another sub-area of the screen, beneath the First Section (104). The second section (108) in this example includes the "accept" widget (in the form of a button) and the "reject" widget (in the form of another button) displayed side-by-side. In this example, the First Section (104) and the Second Section (108) are frozen (i.e., do not scroll) on the screen, but the Content Section (106) is scrollable (i.e., the user may scroll through the text of the user license agreement). However, more than one section may be allowed to scroll, or in some cases all sections may be frozen on the display screen.

Each section includes a section height. Thus, for example, the First Section (104) includes a first height (104H), the Content Section (106) includes a content height (106H), and the Second Section (108) includes a Second Height (108H). The modal dialog (102) may have an modal dialog height equal to at least the sum of the 104H, the Content Section (106), and (if applicable) the Second Height (108H).

A section height is defined as the physical height of the section when displayed on a sub-area of the screen. A section height may, or may not, be large enough to contain the information to be displayed in a corresponding section. For example, the Content Section (106) may be where content of the modal dialog (102) is displayed on the screen. However, if a total height of the content exceeds the content height (106H), then not all of the content will be displayed concurrently in the Content Section (106). Instead, the content will be permitted to scroll within the Content Section (106), in the manner described further below, such that a user is capable of reviewing all of the content.

Nevertheless, as indicated above, a section may contain all of the material for display in a corresponding sub-area of the screen. For example, in the example where the First Section (104) is a company logo, the first height (104H) may be sufficiently large to display the entire company logo. Similarly, in the example where the Second Section (108) is one or more widgets, the Second Height (108H) may be sufficiently large to disapply both widgets. However, in a variation, the Second Height (108H) may be too small to display both widgets, in which case the scrolling frame applicable to the modal dialog (102) will define that the Second Section (108) is scrollable so that the user can scroll between the two widgets. Other variations are possible.

The data repository (100) also stores a Scrolling Frame A (110) and a Scrolling Frame B (116). A scrolling frame is an area of the screen that is allowed to scroll. A scrolling frame is distinct from a section, as in the First Section (104), Content Section (106) of the modal dialog (102). For example, multiple scrolling frames may be defined for a modal dialog. For example, a modal dialog may have the Scrolling Frame A (110) for a portrait mode and the Scrolling Frame B (116) for a landscape mode. Additional scrolling frames may be defined for a modal dialog.

Figure 5:
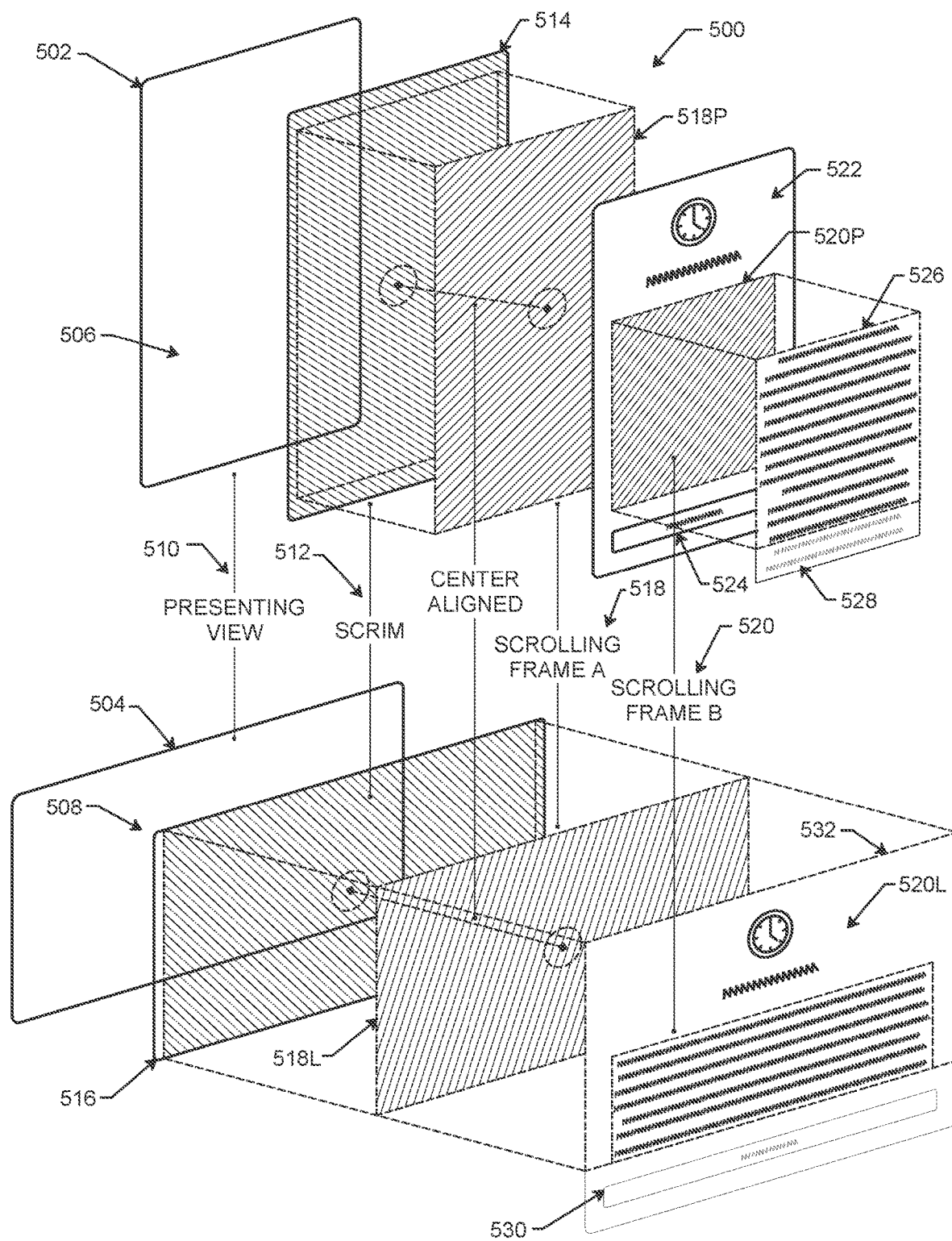

As defined below, priorities assigned to the constraints controlling the heights of the scrolling frames determine which of multiple scrolling frames will apply to a particular section. Thus, scrolling frames, together with constraint priorities, are used to define pre-determined sub-areas of a screen in which one or more sections of the modal dialog (102) are permitted to exhibit scrolling behaviors. Because multiple scrolling frames are defined for a modal dialog, a scrolling frame is not necessarily defined within the area of a single section. An example of scrolling frames and their association with sections is shown in FIG. 5.

As indicated above, each scrolling frame is associated with one or more corresponding constraints, such as Constraint A (112) and Constraint B (118). With respect to the one or more embodiments, a "constraint" is a rule that determines a location and/or size of a corresponding scrolling frame with respect to the physical area of a display screen. With respect to the one or more embodiments, a constraint also may be a property of a scrolling frame itself, with the property defining the scrolling frame's location and/or size. In a technical implementation, a constraint may be an object that represents a prioritized mathematical linear equation of the form: $x=c+f*y$, where x and y are horizontal or vertical locations or sizes of frames within the view hierarchy. The constraint object stores the values of c, f, and p (the priority) as well as references to the objects x and y within the view hierarchy from which it will get y and store x at runtime.

Thus, for example, the Constraint A (112) defines the height of the Scrolling Frame A (110) and the Constraint B (118) defines the height of the Scrolling Frame B (116). When displayed on the GUI, a section of the modal dialog (102) may take up no more space on the screen than that defined by the corresponding constraint for the scrolling frame in effect at that time. If the height of the section exceeds the constraint, then scrolling behavior will be initiated. In this case, only a portion of the information in the corresponding section will be shown, and the user may scroll to review the remainder of the information in the corresponding section. It is expected that the Constraint A (112) is different than the Constraint B (118), and thus, the length and width a section may appear differently in different modes, and further may exhibit different scrolling behaviors because the Scrolling Frame A (110) is different than the Scrolling Frame B (116). An example of these differences is described with respect to FIG. 4A through FIG. 8B.

As indicated above, the Scrolling Frame A (110) and the Scrolling Frame B (116) are defined for the modal dialog (102). Thus, the Scrolling Frame A (110) and the Scrolling Frame B (116) exist regardless of whether the display screen is in portrait mode or in landscape mode. However, as described with respect to FIG. 2 and FIG. 3, competing priorities are used to determine which scrolling frame allows scrolling behavior of the modal dialog (102).

A priority is a number, assigned to a constraint of a scrolling frame, that defines the importance of a constraint when determining which scrolling frame will be applied to the modal dialog (102). In some cases, more than one priority may be assigned to a constraint of a scrolling frame, with a different priority assigned to a constraint of a scrolling frame when the display screen switches between portrait mode and landscape mode.

Thus, for example, the Priority A (114-A) is a number associated with the Constraint A (112) of the Scrolling Frame A (110) when the display screen is in portrait mode. The Priority B (114-B) is another number associated with the Constraint A (112) of the Scrolling Frame A (110) when the display screen is in landscape mode. The Priority C (120) is yet another number associated with the Constraint B (118) Scrolling Frame B (116), and remains constant as the display screen switches between landscape mode and portrait mode. The values of the Priority A (114-A), the Priority B (114-B), and the Priority C (120) are all unequal relative to each other.

More or fewer priorities may be associated with a constraint assigned to a scrolling frame, and the arrangement of priorities may be reversed, or otherwise varied, relative to the Constraint A (112) and the Constraint B (118). For example, while FIG. 1 shows two priorities associated with the Constraint A (112), and one priority associated with the Constraint B (118), it is also possible to have two priorities associated with the Constraint B (118) and one associated with the Constraint A (112). The one or more embodiments may operate in either configuration of priorities assigned to constraints. However, at any given time for a given mode of the display screen, one priority applies to each constraint of each scrolling frame. Use of the constraints is described with respect to FIG. 2 and FIG. 3, and exemplified in FIG. 4A through FIG. 8B.

The data repository (100) also stores a command (122). The command (122) is a directive to a computer program to perform a task. In an example, the command (122) may be a directive to display the modal dialog (102) on the screen. In another example, the command (122) may be a directive to change an applicable priority of the Constraint A (112) of the Scrolling Frame A (110) between the Priority A (114-A) and the Priority B (114-B). Other commands, as well as combinations of commands, are possible.

The data repository (100) also stores a determination (124). The determination (124) is the output of a software program, i.e., logic or rules, that indicates whether the display screen of a device is in a portrait orientation or in a landscape orientation.

The data repository (100) also stores a relative hierarchy (126). The relative hierarchy (126) is a numerical difference between the priorities applicable to the Constraint A (112) and the Constraint B (118).

In the example of FIG. 1, the Priority A (114-A) is less than the Priority C (120), and thus the relative hierarchy (126) in this case is that the Priority A (114-A) is lower than the Priority C (120). However, the Priority B (114-B) is greater than the Priority C (120), and thus the relative hierarchy (126) in this case is that the Priority C (120) is lower than the Priority B (114-B). Because the Priority A (114-A) applies in portrait mode, and the Priority B (114-B) applies in landscape mode, the relative hierarchy (126) between the Constraint A (112) and the Constraint B (118) changes when the display screen changes between portrait mode and landscape mode. The relative hierarchy (126) may include a raking of multiple other priorities when additional constraints are present for additional scrolling frames.

The data repository (100) also stores an applicable priority (128). The applicable priority (128) is the priority that is the lowest priority at a given moment in time. For example, if the Priority A (114-A) is deemed to be the lowest priority when the screen is in portrait mode, and the determination (124) is that the screen is in portrait mode, then in this example the Priority A (114-A) is the applicable priority (128). The applicable priority (128) may change over time as the screen changes orientation, or according to additional rules. The applicable priority (128) determines which of the Constraint A (112) and the Constraint B (118) is the applicable constraint, and thus which of the Scrolling Frame A (110) or the Scrolling Frame B (116) is the applicable scrolling frame.

The lowest priority is the applicable priority (128), because the smallest constraint controls whether scrolling behavior will be initiated. If the Constraint A (112) is lower, then the scrolling behavior of the Scrolling Frame A (110) will be applied to display of the modal dialog (102). However, if the Constraint B (118) is lower, then the scrolling behavior of the Scrolling Frame B (116) will be applied to the modal dialog (102). In this manner, even though multiple scrolling frames are defined for the modal dialog (102) at all times, only one of the scrolling frames will be applied to the modal dialog (102) at a given time. The scrolling frame that is applied is the scrolling frame having the smaller constraint priority. The other scrolling frame, while still present, will not control scrolling behavior of the modal dialog (102) in a given screen orientation.

Nevertheless, from a technical perspective, the higher priority constraint "wins" the comparison between the Constraint A (112) and the Constraint B (118). The terms "applicable" and "wins" are used and defined specifically to enhance clarity between the effect of the one or more embodiments, and how the one or more embodiments operate technically. The term "applicable" is used to describe the effect of the priority comparison. As indicated above, the applicable priority (128) will be the losing priority, for the reasons given above in the prior paragraph. Thus, the scrolling frame having the lowest constraint priority will be the applicable scrolling frame. In contrast, the term "wins" describes the technical operation that occurs when the priorities are compared. Specifically, the two constraints both attempt to make their respective scroll areas tall enough to contain their respective content. The scrolling frame with the highest priority "wins" the priority contest, in the sense that if the two priorities were to ever conflict, then the winning constraint would control scrolling behavior. However, the conflict does not arise because sections of the modal dialog will begin to scroll when the height of a modal dialog section reaches the scrolling frame with the lowest constraint priority, and hence the higher priority constraint is not engaged. In this manner, the lower priority scrolling frame constraint will force one or more sections of the modal dialog to begin scrolling behavior before the higher priority scrolling frame constraint is reached. Accordingly, even though the higher priority scrolling frame "wins" the priority comparison, the losing priority scrolling frame actually controls the scrolling behavior of the modal dialog sections. Therefore, again, the lower priority scrolling frame is the "applicable" scrolling frame (i.e., the lower priority is the applicable priority (128)), even though the higher priority would "win" the priority comparison test.

Attention is now turned to the term "scrolling behavior." A "scrolling behavior" is one or more rules defined by a corresponding scrolling frame to be applied to the sections of the modal dialog (102). A "scrolling behavior" is not a distinctly stored data object, apart from a scrolling frame. Nevertheless, a "scrolling behavior" is a term useful for referring to how one or more of the sections of the modal dialog (102) scrolls when a user provides a command to scroll some portion of the modal dialog (102).

In the example of FIG. 1, the Scrolling Behavior A (130) is the scrolling behavior defined by the Scrolling Frame A (110) for the modal dialog (102). In turn, the Scrolling Behavior B (132) is the scrolling behavior defined by the Scrolling Frame B (116) for the modal dialog (102).

In a more specific example, the Scrolling Behavior A (130) specifies that the First Section (104) and the Second Section (108) are frozen, but that the Content Section (106) is allowed to scroll content when the content does not entirely fit within the Content Section (106). The Scrolling Behavior A (130) is in effect when the screen is in portrait mode. However, the Scrolling Behavior B (132) specifies the First Section (104), the Content Section (106), and the Second Section (108) all scroll together. The Scrolling Behavior B (132) is in effect when the screen is in landscape mode. The above example does not limit the one or more embodiments, as many other possible scrolling frames and scrolling behaviors, and combinations thereof, are possible.

The system shown in FIG. 1 may also include a controller (134). The controller (134) is software and/or application-specific hardware that controls the manipulation and application of priorities, constraints, and scrolling frames to the modal dialog (102). Thus, the controller (134) controls how the modal dialog (102) will be displayed on the screen. The controller (134) may be part of the device of which the screen is a part (e.g., local to a mobile device), or may be located remotely and control a remote mobile device via wired or wireless communications. Operation of the controller is described with respect to FIG. 2 and FIG. 3.

The system shown in FIG. 1 may also include a device, shown in FIG. 1 as the device in portrait mode (136-P) and the device in landscape mode (136-L). The device in portrait mode (136-P) is shown in solid lines and the device in landscape mode (136-L) is shown in dashed lines to indicate that only a single device is present, but portrayed in two different orientations at two different times.

The device in portrait mode (136-P) is shown in a portrait orientation (i.e., the screen is in an orientation so that a longer length of the screen is pointed about along the direction of gravity). The device in portrait mode (136-P) includes a Display Screen in Portrait Mode (138-P) which is composed of three areas, a sub-area P-1 (140), a sub-area P-2 (142), and a sub-area P-3 (144). More or fewer sub-areas may be present. In the example of FIG. 1, the sub-area P-2 (142) is larger than the sub-area P-1 (140) and the sub-area P-3 (144).

The device in landscape mode (136-L) also includes three sub-areas, a sub-area L-1 (146), a sub-area L-2 (148), and a sub-area L-3 (150). The sub-area L-1 (146), the sub-area L-2 (148), and the sub-area L-3 (150) may be longer than and narrower than the corresponding sub-areas in the device in portrait mode (136-P) (i.e., the sub-area P-1 (140), the sub-area P-2 (142), and the sub-area P-3 (144)). Note that the sub-areas shown in FIG. 1 are not necessarily shown to scale, relative to each other.

While three sub-areas may be included in each orientation mode, the sub-areas may be differently arranged, sized, or shaped in the two (or more) different orientations. The sections of the modal dialog (102) are displayed in corresponding ones of the different sub-areas (e.g., the First Section (104) is displayed in the sub-area P-1 (140) or the sub-area L-1 (146)). However, the arrangement, size, and shape of sub-areas do not necessarily control scrolling behavior of the section modal dialog (102). Rather, the scrolling frames, constraints, and priorities determine how the different sections of the modal dialog (102) will scroll with respect to each of the sub-areas in either the device in portrait mode (136-P) or the device in landscape mode (136-L).

While FIG. 1 shows a configuration of components, other configurations may be used without departing from the scope of the one or more embodiments. For example, various components may be combined to create a single component. As another example, the functionality performed by a single component may be performed by two or more components.

Figure 2:
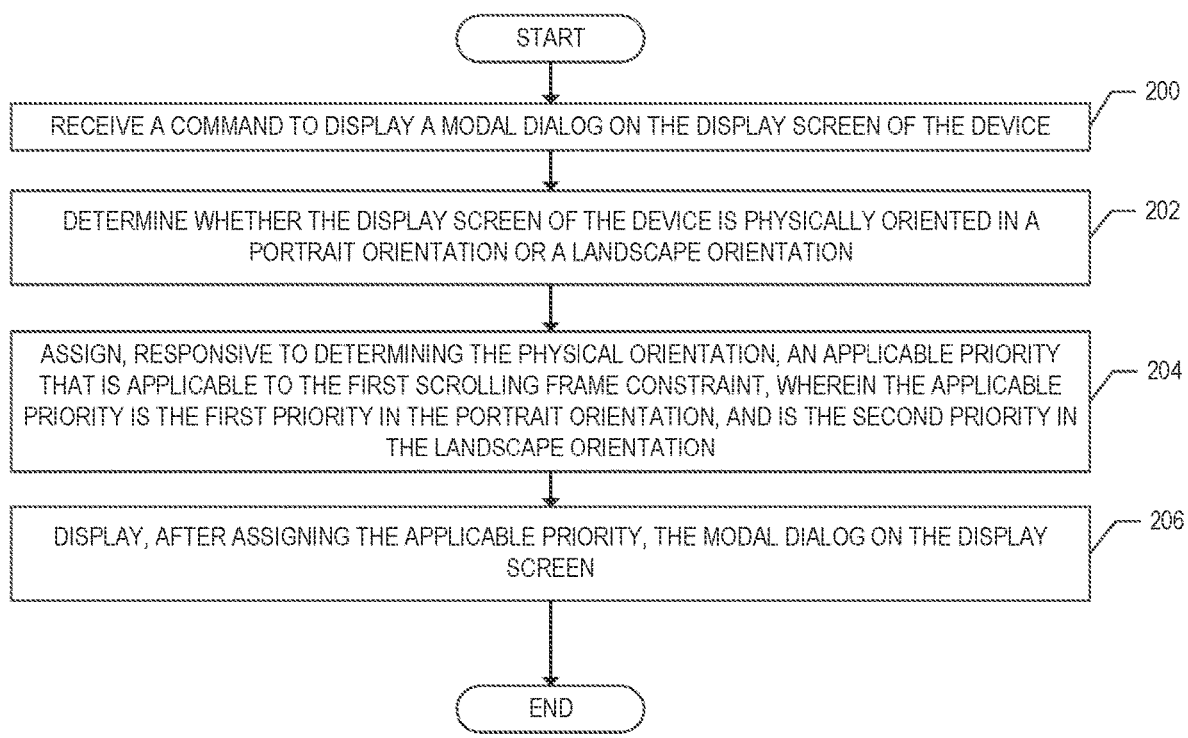
FIG. 2 and FIG. 3 show flowcharts, in accordance with one or more embodiments.
Figure 3:
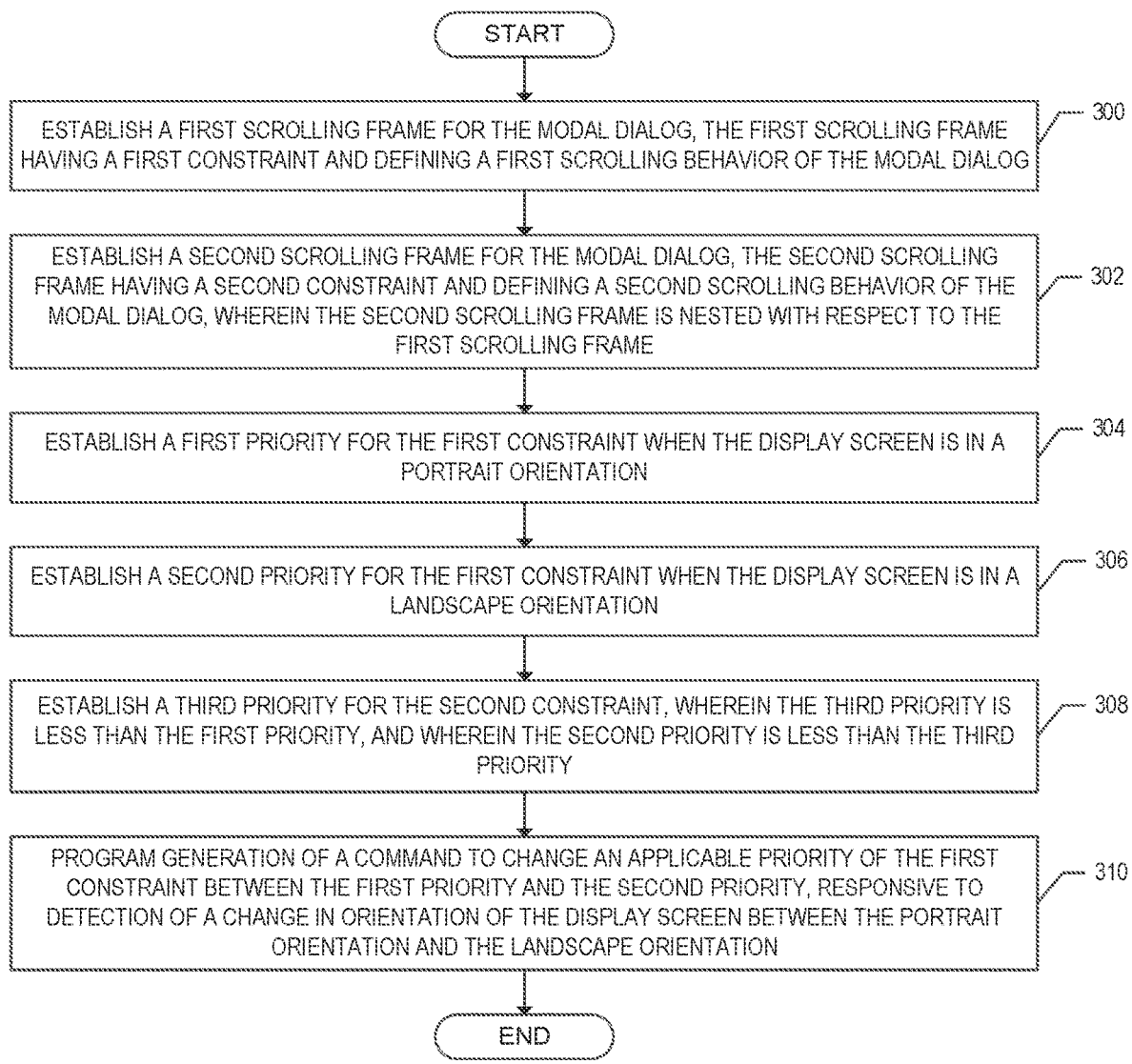

FIG. 2 and FIG. 3 are flowcharts, in accordance with one or more embodiments. In particular, FIG. 2 is a method of displaying a modal dialog on a display screen of a device and FIG. 3 is a method of programmatically controlling scrolling behavior of a modal dialog when the modal dialog is displayed on a display screen of a device. The methods of the flowcharts shown in FIG. 2 and FIG. 3 may be performed using the system shown in FIG. 1, possibly using the computing system and network environment described with respect to FIG. 9A and FIG. 9B.

Step 200 includes receiving a command to display a modal dialog on the display screen of the device. The command may be received either from a user, who activates the modal dialog via a widget or some other input device connected to or part of the device. The command also may be received from another software process that issues the command to display the modal dialog.

Step 202 includes determining whether the display screen of the device is physically oriented in a portrait orientation or a landscape orientation. The determination may be made, for example, using an inclinometer to measure an orientation of the user device with respect to gravity and then determine whether the device is in portrait or landscape mode, accordingly. The determination could also be made using other techniques, such as for example to use an accelerometer to detect a changing orientation of the device relative to a reference frame, or a magnetometer measure the orientation of the device with respect the Earth's magnetic field.

Step 204 includes assigning, responsive to determining the physical orientation, an applicable priority that is applicable to the first scrolling frame constraint, wherein the applicable priority is the first priority in the portrait orientation, and is the second priority in the landscape orientation. Assigning may be performed by a controller executing one or more rules. For example, when the display screen is in the portrait orientation, a rule may assign the first priority as the applicable priority. Similarly, when the display screen is in the landscape orientation, the rule (or another rule) may assign the second priority as the applicable priority.

Changing the applicable priority will result in changing the scrolling behavior of the modal dialog. Specifically, a lower priority of the third priority and the applicable priority controls which of the first scrolling frame and the second scrolling frame controls scrolling behavior of the modal dialog.

The first scrolling frame may be nested with respect to the second scrolling frame. In other words, both scrolling frames may be defined with respect to each other, including one within the other. An example of the relationship between priorities and scrolling frames, as well as nested scrolling frames, is provided with respect to FIG. 4A through FIG. 8B.

Step 206 includes displaying, after assigning the applicable priority, the modal dialog on the display screen. Displaying is performed by the controller issuing a command to display the modal dialog on the display screen using, for example, a graphics processor. Displaying is performed according to one of the first scrolling behavior and the second scrolling behavior. The scrolling behavior selected depends on the constraint having the lower priority in the relative hierarchy, as explained with respect to FIG. 1. In one embodiment, the method of FIG. 2 may terminate thereafter.

For example, in the portrait orientation, the second scrolling frame controls the scrolling behavior of the modal dialog because the second scrolling frame constraint's third priority is lower than the applicable priority of the first scrolling frame (the first priority). The scrolling behavior is the second scrolling behavior, in this example. The second scrolling behavior permits scrolling of the content section of the modal dialog. The second scrolling behavior concurrently freezes, on the display screen, a first section of the modal dialog, the first section being different than the content section.

The second scrolling behavior could also concurrently freeze, on the display screen, a second section of the modal dialog (different than the first section and the content section). The arrangements of the sections may be varied in different sub-areas of the display screen. For example, the first section may be displayed above the content section, and the second section may be displayed below the content section. However, other display arrangement variations are possible.

With respect to the portrait orientation, step 206 may also be characterized as follows. The applicable priority is the first priority. The third priority is less than the applicable priority. Thus, displaying includes expanding a height of the content section to the second scrolling constraint, and responsive to the height of the content section exceeding the second scrolling constraint, permitting scrolling of the content section. Displaying may also include displaying at least one additional section of the modal dialog on a frozen area of the display screen.

In another example, in the landscape orientation, the first scrolling frame controls the scrolling behavior of the modal dialog because the applicable priority of the first scrolling frame's constraint (the second priority) is lower than the third priority of the second scrolling frame's constraint. The scrolling behavior is the first scrolling behavior in this example. The first scrolling behavior permits scrolling of an entirety of the modal dialog, including both the content section, the first section, and/or the second section of the modal dialog.

Still other examples are possible. For example, additional scrolling frames with additional scrolling frame constraints may be defined, with corresponding additional priorities defined for the additional scrolling frame constraints. In yet another example, a scrolling frame may define that multiple sections of the modal dialog are allowed to scroll in multiple sub-areas of the display screen. Many other variations are possible.

With respect to the landscape orientation, step 206 may also be characterized as follows. The applicable priority is the second priority. The applicable priority is less than the third priority. Thus, displaying includes expanding a height of the content section to the first scrolling constraint, and responsive to the height of the modal dialog exceeding the first scrolling constraint, permitting scrolling of an entirety of the modal dialog section.

In summary, the one or more embodiments operate by using multiple nested scrolling frames. The heights of the nested scrolling frames are constrained to attempt to equal the heights of their respective contents, but the constraints for the multiple nested scrolling frames are different from each other. In cases where all of the content will not fit on an assigned sub-area of the screen, the different height constraints are in competition with one another. The relative priorities of the height constraint of at least one scrolling frame are adjusted when the display screen changes between portrait and landscape modes. The adjustment of the priorities of the at least one of scrolling frame will determine which scrolling frame will govern the scrolling behavior of the modal dialog when the modal dialog is presented to a user. The change in scrolling behavior between portrait and landscape modes prevents an awkward and unintuitive presentation of the modal dialog to a user.

Attention is now turned to a specific example of the assigning step (step 204) and the displaying step (step 206). First, attention is turned the display screen in portrait mode. The content scroll area height constraint (the second constraint of the second scrolling frame) has priority 250 (the third priority) and the modal dialog scroll area height constraint (the first constraint of the first scrolling frame) has priority 251 (the first priority). Thus, when the size of the modal dialog reaches its limit, the content section of the modal dialog will no longer be able to expand. Accordingly, the content area will be fixed at that maximum height. Content will scroll when a portion of the content will not fit within the sub-area of the display screen assigned to the content section of the modal dialog.

Second, attention is turned to the display screen in landscape mode. The content scroll area height constraint (the second constraint of the second scrolling frame) still has priority 250, but now the assigned priority of the modal dialog constraint (the second priority of the first constraint of the first scrolling frame) has changed. Specifically, the modal dialog scroll area height constraint (the first constraint of the first scrolling frame) now has priority 249. Thus, when the size of the modal dialog reaches the limit defined by the first constraint, the content section will be allowed to expand to accommodate all of the content, but the modal dialog scroll view will not be able to expand. Thus, the entire modal dialog will scroll with all of the content displayed below the first section (e.g., a header) and above the second section (e.g., buttons).

The one or more embodiments contemplate additional constraints applicable to different areas of the display screen. For example, additional constraints may control the scrim distances, other spacings, and margins, etc. See FIG. 4A through FIG. 8B. In particular, the modal dialog scroll area may have additional higher priority constraints that limit the modal to be constrained within the overall screen size. Thus, even when the modal dialog scroll area (the first scrolling frame) is applicable scrolling frame, the modal dialog scroll area will still be limited to within the screen, rather than being allowed to be big enough to contain the entire "round rectangle" of the modal dialog. Accordingly, this additional constraint prevents the modal dialog from being clipped by the size of the screen. In other words, additional higher priority constraints can be used to limit a modal dialog to the overall screen size, and thereby enable the entirety to the modal dialog to be scrollable.

Attention is now turned to FIG. 3. Again, FIG. 3 is a flowchart of a method for programmatically controlling of scrolling behavior of a modal dialog when the modal dialog is displayed on a display screen of a device. The method of FIG. 3 may be implemented using the system shown in FIG. 1, possibly using one or more elements of the computing system and/or network environment shown in FIG. 9A and FIG. 9B.

Step 300 includes establishing a first scrolling frame for the modal dialog, the first scrolling frame having a first constraint and defining a first scrolling behavior of the modal dialog. Subsequently, or perhaps concurrently, step 302 includes establishing a second scrolling frame for the modal dialog, the second scrolling frame having a second constraint and defining a second scrolling behavior of the modal dialog, wherein the second scrolling frame is nested with respect to the first scrolling frame.

A scrolling frame may be established for the modal dialog as follows. First, a hierarchy for the modal dialog view is initialized according to a structure of the modal dialog. For example, header, content, and call to action sections are initialized, and then views are created for a scrim surrounding the modal dialog. The scrim dims the view behind the modal dialog, which is typically the view of the view controller which presents the modal dialog. In particular, the scrim does not dim the scroll view, round rectangle, the header, content, or other sections of the modal dialog because they are in front of the scrim view in the view hierarchy.

The various views are created and made sub-views of one another to create a view hierarchy. Concurrently, each view is assigned constraints sufficient to determine their location and size.

When the content view initializes itself, it creates a scroll view and constrains a "first scrolling frame" to fill its width, to be 0 (or more) points in from its top and to be as high as its child content view. Taken together, these constraints will provide the origin and size of the first scrolling frame once all the sub views are populated at runtime.

The second scrolling frame is constrained to have its left and right edges to be inset from left and right the edges of the screen by a scrim width, its top greater than or equal to the top of the screen, and its bottom edge less than or equal to the bottom edge of the screen. The second scrolling frame is further constrained to have its vertical and horizontal centers align with the vertical and horizontal centers of the screen at a high, but not required priority. This arrangements allows the modal dialog to be able to show content that does not require the whole dialog centered on the screen without taking up the full height.

Finally, the second scrolling frame is constrained to have its height equal to the height of its child a round rectangle background view (which is in turn the parent of the three modal dialog subsections), but at a low priority just greater than or less than the priority of the height constraint of the first scrolling frame depending on the device orientation.

Thus is provided a method for establishing first and second scrolling frames at steps 300 and 302. However, other methods may also be used, depending on the number of sections of a modal dialog, the number of scrolling frames to be applied, and possibly other factors.

Step 304 includes establishing a first priority for the first constraint when the display screen is in a portrait orientation. Establishing the first priority may be performed by assigning a priority number to the first constraint.

Step 306 includes establishing a second priority for the first constraint when the display screen is in a landscape orientation. Establishing the second priority may be performed using a method similar to that described with respect to step 304. Step 306 may be performed after, or concurrently with, step 304.

Step 308 includes establishing a third priority for the second constraint, wherein the third priority is less than the first priority, and wherein the second priority is less than the third priority. Establishing the third priority may be performed using a method similar to that described with respect to step 304. Step 308 may be performed after, or concurrently with, either one of step 304 or step 306, or both.

Step 310 includes programmatically generating of a command to change an applicable priority of the first constraint between the first priority and the second priority, responsive to detection of a change in orientation of the display screen between the portrait orientation and the landscape orientation. Generation of the command may be performed by executing a computer program whose output is the command. The program may include a rule whose execution is triggered by the change in orientation of the display screen. Thus, for example, the rule indicates that the first priority applies to the first scrolling frame constraint in the portrait orientation, but the second priority applies to the first scrolling frame constraint in the landscape orientation. The command to change the applicable priority forces a change between the first scrolling behavior and the second scrolling behavior, by determining which constraint will be applied to the modal dialog. In one embodiment, the method of FIG. 3 may terminate thereafter.

The method of FIG. 3 may be varied. For example, when the display screen is in the portrait orientation, the first priority is the applicable priority. In this case, the second constraint of the second scrolling frame controls display of the modal dialog. Accordingly, the second scrolling behavior applies to display of the modal dialog. Thus, for example, the first section (and possibly second section) of the modal dialog are frozen in two sub areas of the display screen, while the content section of the modal dialog is permitted to scroll in a third sub-area of the display screen.

In another example, when the display screen is in the landscape orientation, the second priority is the applicable priority. Thus, the first constraint of the first scrolling frame controls display of the modal dialog. Accordingly the first scrolling behavior applies to display of the modal dialog. Thus, for example, the entire modal dialog (i.e., all of the sections of the modal dialog together) scroll as a whole on the display screen.

While the various steps in the flowcharts shown in FIG. 2 and FIG. 3 are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt-driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments. Thus, the one or more embodiments are not necessarily limited by the examples provided herein.

FIG. 4A through FIG. 8B present a specific example of the techniques described above with respect to FIG. 1 through FIG. 3, and should be considered as a whole. Thus, common reference numerals in FIG. 4A through FIG. 8B refer to common objects with common descriptions. The following example is for explanatory purposes only and is not intended to limit the scope of the one or more embodiments.

Figure 4A:
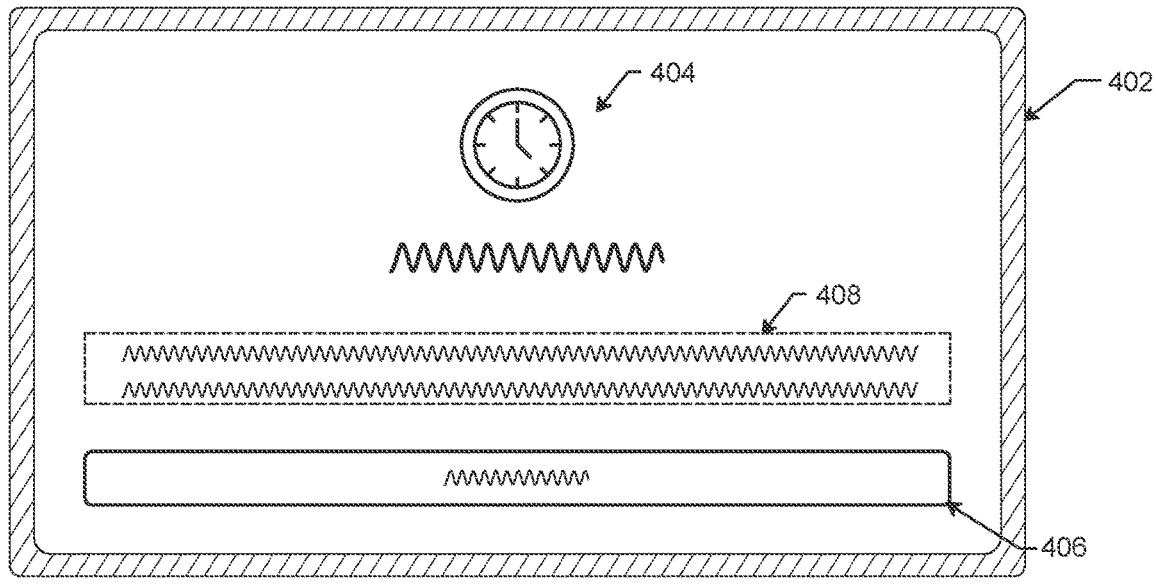

Attention is first turned to FIG. 4A, which shows scrolling behavior (400) in landscape mode when the methods of one or more embodiments are not in use. The screen (402) includes three sub-areas of the display screen, first sub-area (404), second sub-area (406), and third sub-area (408). The first sub-area (404) of the display screen shows a first section of a modal dialog entitled "Lorem ipsum" with an image of a clock. The first sub-area (404) of the display screen is frozen with respect to the screen (402), and thus does not scroll. Similarly, the second sub-area (406) of the display screen shows a second section of the modal dialog, which is a widget also entitled "Lorem ipsum," though the widget may be manipulated by the user to input a command via the screen (402). The second sub-area (406) of the display screen is also frozen with respect to the screen (402), and thus does not scroll.

However, the third sub-area (408) of the display screen shows a third section of the modal dialog, which is content the user is to review. The height of the content does not fit the height of the third sub-area (408). Thus, scrolling is enabled within the third sub-area (408). While the size of the third sub-area (408) does not change, the user may move the content of the third section of the modal dialog with respect to the third sub-area (408). The resulting scrolling behavior (400) may be considered undesirable in some instances. The third sub-area (408) only shows two lines in the example, and thus may be more difficult for some users to command scrolling of the content, and may be more difficult to read.

Figure 4B:
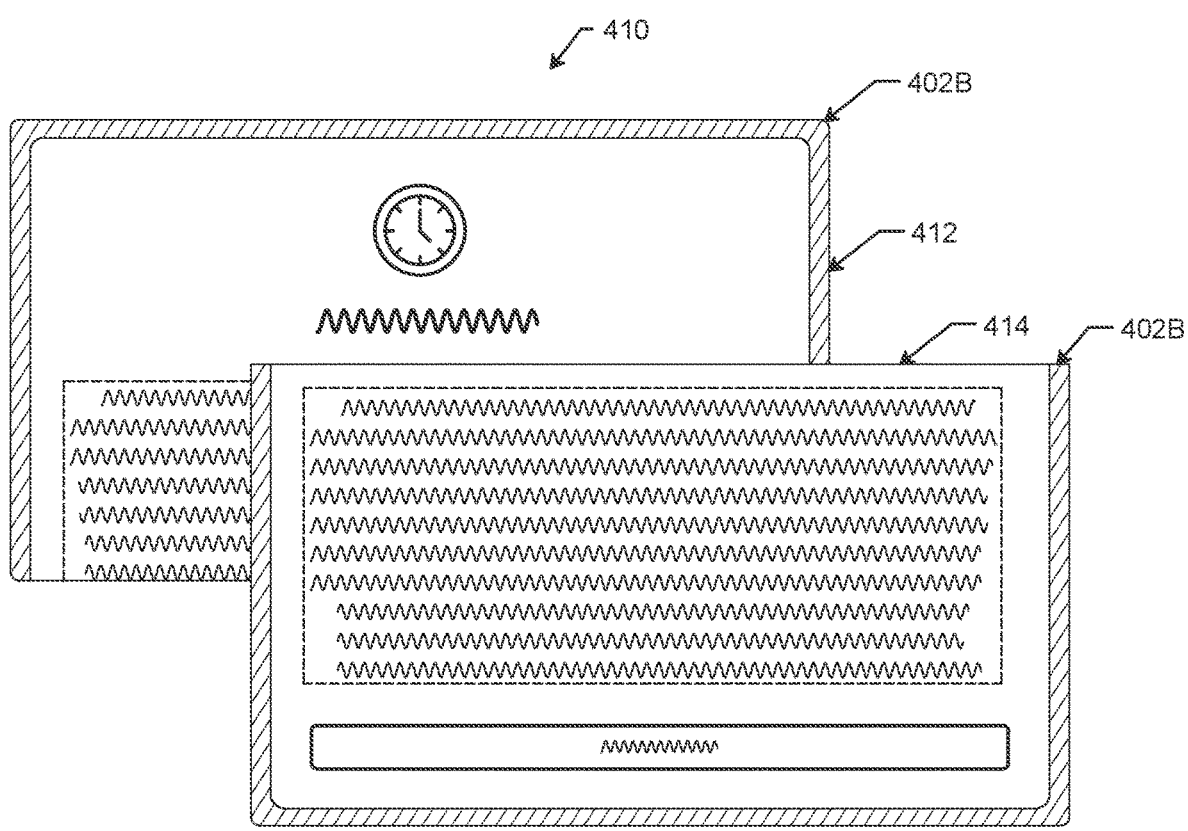

FIG. 4B shows one possible result of the one or more embodiments when the modal dialog is displayed in landscape mode. Rather than displaying the three sections of the modal dialog in the three sub-areas of the screen (402B), where two of the sub-areas are frozen, all three sections of the modal dialog are shown on the screen (402B). However, for the first scrolling position (412), the entire content of the modal dialog (i.e., all three sections in this example) are permitted to scroll as a single document. For this reason, the effective height for displaying content is the height of the screen (402B) itself when the first scrolling position (412) is engaged. Thus, for example, the user may initially see the screen shown at first scrolling position (412), but then as the user scrolls downwardly, the second scrolling position (414) is shown. The second scrolling position (414) no longer shows the first section of the modal dialog (the title and logo), but does show the second section (the widget) and third section (the content). The first scrolling position (412) shown in FIG. 4B may be considered more helpful to some users.

Attention is now turned to FIG. 5. FIG. 5 shows a layer structure (500) of multiple scrolling frames. The layer structure (500) is an example of nested scrolling frames, as mentioned above.

In particular, FIG. 5 shows a screen of a device in two orientations, a screen in portrait mode (502) and a screen in landscape mode (504). The orientation of the device also may be referred to as a presenting view (510). While only one device is in use, the presenting view (510) is shown to indicate the two different positions of the device on the same page in order to more clearly show the nested layer structure of the scrolling frames.

Each orientation shows a scrim layer (512). The scrim layer (512) changes with the orientation of the device. Thus, the scrim layer (512) is shown as a scrim layer in portrait mode (514) when the device is held in a portrait orientation, and the scrim layer (512) is shown as a scrim layer in landscape mode (516) when the device is held in a landscape orientation. The scrim layer is shown as a partially opaque border that surrounds the modal dialog shown on the screen. The scrim layer may render the presenting view untappable (i.e. the user's use of a touch screen is constrained at the scrim layer (512)), thus forcing the user to finish their interaction with the modal dialog.

The example of FIG. 5 includes two scrolling frames. The nested scrolling frames include a scrolling frame A (518) and a scrolling frame B (520). The scrolling frame B (520) is nested with respect to the scrolling frame A (518). Note that both scrolling frames exist in both orientations of the device. However, as described below, priorities on constraints associated with the scrolling frames determine which of the two scrolling frames (i.e., the scrolling frame A (518) and the scrolling frame B (520)) are used in determining scrolling behavior of the modal dialog in any given orientation.

For clarity, the scrolling frame A (518) is shown in the portrait orientation as reference numeral (518P), whereas the scrolling frame A (518) is shown in the landscape orientation as reference numeral (518L). Likewise, the scrolling frame B (520) is shown in the portrait orientation as reference numeral (520P), whereas the scrolling frame B (520) is shown in the landscape orientation as reference numeral (520L).

For the scrolling frame A (518), the entire sub-area inside the scrim layer (512) is permitted to scroll. In the scrolling frame A (518), an attempt is made to fit the entire height of all three sections of the modal dialog. If the entire height of all three sections of the modal dialog does not fit the screen, then scrolling frame A (518) attempts to dictate that the entire modal dialog is presented as a single scrollable unit. See FIG. 6A, for example.

However, for the scrolling frame B (520), two sections of the modal dialog are displayed in frozen (i.e., non-scrollable) sub-areas of the screen, namely the first sub-area (522) and the second sub-area (524). A third (content) section of the modal dialog is permitted to scroll in a third sub-area (526) of the screen. Specifically, in the scrolling frame B (520), an attempt is made to fit the entire height of only the third (content) section of the modal dialog within the third sub-area (526) of the screen. If the entire height of the third (content) section of the modal dialog does not fit within the third sub-area (526), then the scrolling frame B (520) dictates that the third (content) section of the modal dialog is presented as scrollable in the third sub-area (526). Content present, but not displayed, is shown for reference in content section (528) (in portrait mode) and content section (530) (in landscape mode) in order to compare the heights of the content versus the heights of the third sub-area (526).

As indicated above, both scrolling frames (the scrolling frame A (518) and the scrolling frame B (520)) exist concurrently in both the portrait mode (502) and the landscape mode (504). For example, as shown in FIG. 5, when the scrolling frame B (520) controls in the portrait mode (502), then the third sub-area (526) has relative dimensions as shown at scrolling frame B in portrait mode (520P), and scrolling is permitted in the third sub-area (526). However, when the scrolling frame A (518) controls in the landscape mode (504), then the entire modal dialog is permitted to scroll in the entire display area (532) inside the scrim layer (512).

As can be seen, the two scrolling frames are in competition with each other. A priority scheme assigned to constraints of the scrolling frames of the modal dialog resolves the competition.

In particular, two constraints may be assigned to the scrolling frame A (518) and a third constraint is assigned the scrolling frame B (520). At any given time, only one constraint is assigned to the scrolling frame A (518). In particular, the first constraint is assigned to the scrolling frame A (518) when the portrait mode (502) is engaged, and the second constraint is assigned to the scrolling frame A (518) when the landscape mode (504) is engaged.

The constraint with the lowest priority will dictate which scrolling frame constraint will apply, and hence which scrolling frame will apply, and thence which scrolling behavior controls display of the modal dialog. Accordingly, by changing the relative priority of the first constraint and the second constraint of the scrolling frame A (518) relative to the third priority of the scrolling frame B (520), the scrolling behavior of the modal dialog can be changed as the mode (i.e., landscape or portrait) of the screen changes.

For example, in portrait mode, the first priority of the scrolling frame A (518) is assigned to constraint of scrolling frame A. The third priority of the scrolling frame B (520) is less than the first priority of the scrolling frame A (518). As a result, in portrait mode, the first sub-area (522) and the second sub-area (524) are frozen, and the contents section of the modal dialog (scrolling frame B (520)) will expand to fill the available space between the first sub-area (522) and the second sub-area (524). Content height in excess of the available height of the scrolling frame B (520) will cause the content area to scroll within the scrolling frame B (520), as shown at reference numeral (520P). The second constraint will not be engaged at all, because the third constraint priority is less than the first constraint priority.

However, in landscape mode, the second priority of the scrolling frame A (518) is assigned to the scrolling frame A (518). The third priority of the constraint of the scrolling frame B (520) is greater than the second priority of the constraint of the scrolling frame A (518). As a result, in landscape mode, the entire modal dialog will expand to fill the height of the scrolling frame A (518L). Modal dialog height (i.e., the combined height of all modal dialog sections) in excess of the scrolling frame A (518) will cause the entire modal dialog to scroll within the scrolling frame A (518L). The first constraint will not be engaged at all, because the first constraint priority is less than the third constraint priority.

Other priority schemes may be used. Thus, the one or more embodiments are not limited to the example described herein.

Figure 6B:
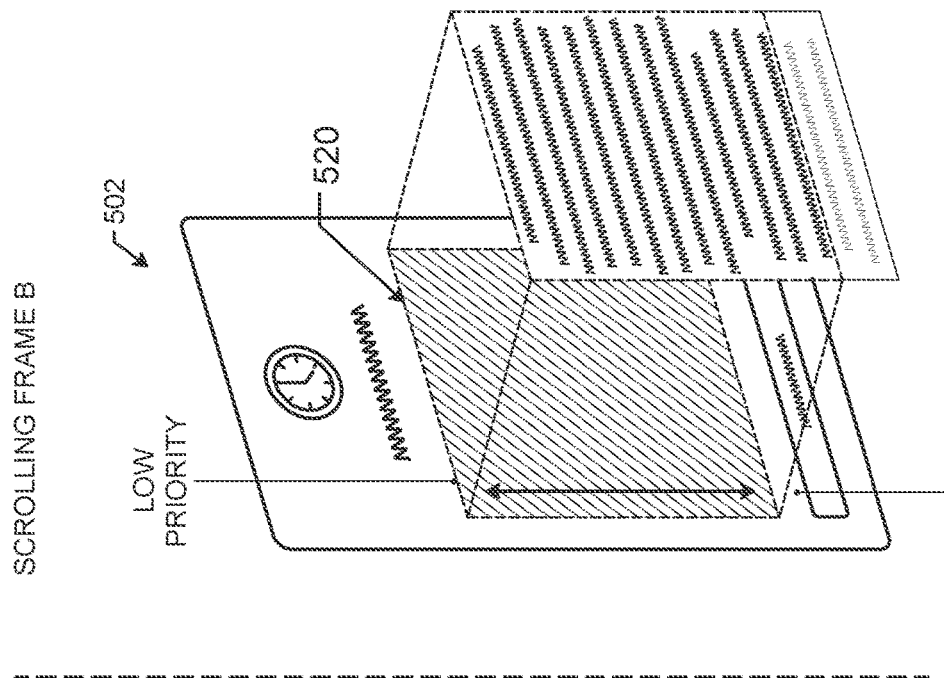
Figure 6A:
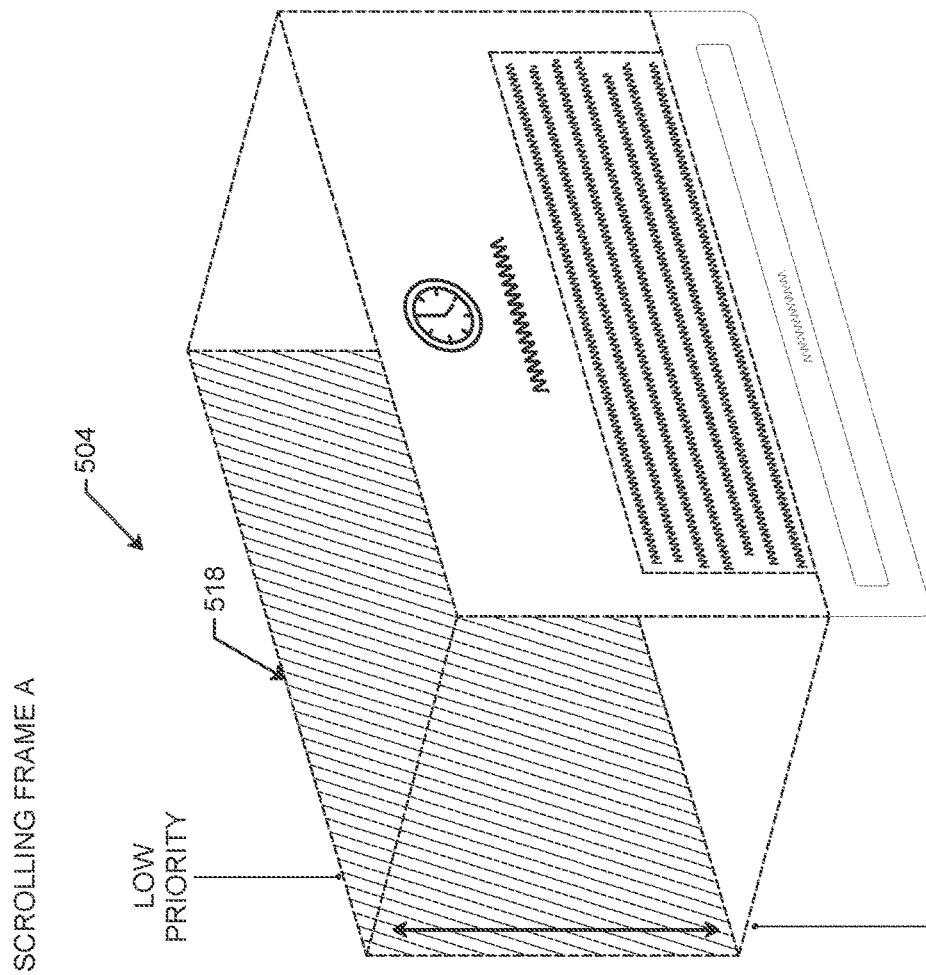

The results of the above-described priority switching scheme are shown in FIG. 6A and FIG. 6B. FIG. 6A shows the results of when the scrolling frame A (518) scrolls (in the landscape mode (504)). FIG. 6B shows the results of when the scrolling frame B (520) scrolls (in the portrait mode (502)).

The same results and procedures are described in FIG. 5A and FIG. 5B. However, FIG. 6A and FIG. 6B show the results of the one or more embodiments more clearly. FIG.

6A and FIG. 6B further show that the lower priority constraint determines which scroll area will not be sized large enough to hold its content, and thus will scroll, for the reasons given above in FIG. 5A and FIG. 5B. Thus, for example, the scrolling frame A (518) has the lower constraint priority in FIG. 6A, but the scrolling frame B (520) has the lower constraint priority in FIG. 6B.

Attention is now turned to FIG. 7A through FIG. 8B, which show one possible advantage of the one or more embodiments when the device is engaged in the landscape mode (504).

FIG. 7A and FIG. 7B show different views of the landscape mode (504) display of the modal dialog before application of the one or more embodiments. The height of the scroll sub-area (700) is small relative to the total height of the content of the modal dialog. The difference in heights is emphasized by the relatively large size of the overflow content (702) of the content section of the modal dialog, relative to the shown size of the scroll sub-area (700), as shown in FIG. 7A.

What the user sees, without the one or more embodiments, is the display (704) shown in FIG. 7B. The title and logo section (706) of the modal dialog is shown frozen, as is the widget section (708) of the modal dialog. However, the scroll sub-area (700) only allows presentation of two lines of the content section of the modal dialog, which is considered in this example to be undesirable as being difficult to manipulate and difficult to read.

FIG. 8A and FIG. 8B show different views of the landscape mode (504) display of the modal dialog after application of the one or more embodiments. In the example of FIG. 8A, scrolling frame B (520) has been made large enough to hold all of its content, but scrolling frame A (518) has not. Thus, the entire round rectangle modal dialog (e.g., the title and logo section (800), widget section (802), and content section (804 and 806) will scroll within scroll frame A (518).

However, because the device is in the landscape mode (504), the lower priority of the scrolling frame A (518) controls the scrolling behavior of the modal dialog. Specifically, the scrolling frame A (518) applies, not the scrolling frame B (520), because the constraint priority of the scrolling frame A (518) is less than the constraint priority of the scrolling frame B (520). As a result, the scrolling frame B (520) is never engaged.

Accordingly, what the user sees is shown in FIG. 8B. The title and logo section of the modal dialog, as well as the first portion of the content section of the modal dialog, are initially shown on the screen. The user is then permitted to scroll the entire modal dialog to reveal the remainder of the content section and, finally, the widget section of the modal dialog, as dictated by the scrolling behavior programmed for the scrolling frame A (518). The presentation of the display (808) of the modal dialog in FIG. 8B may be considered superior, in some cases, to the display shown in FIG. 7B, because the user sees more of the content area and may more easily manipulate the scrolling behavior of the modal dialog being presented on the screen.

Figure 9A:
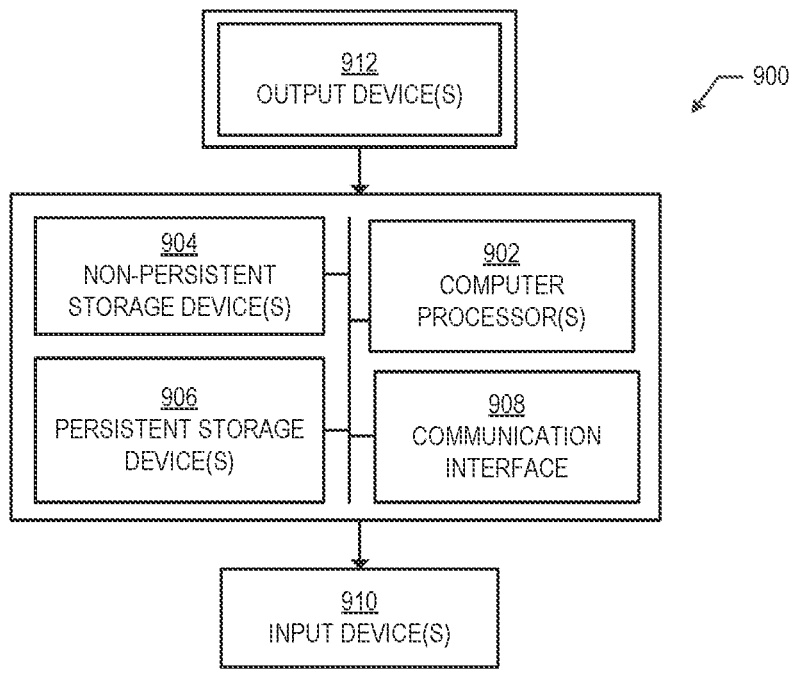
FIG. 9A and FIG. 9B show a computing device and network environment, in accordance with one or more embodiments.
Figure 9B:
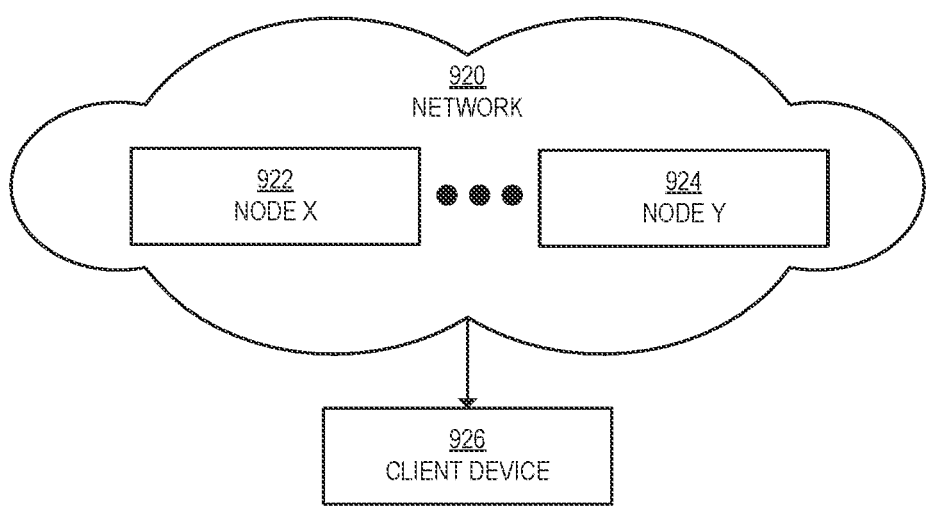

FIG. 9A and FIG. 9B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 9A, the computing system (900) may include one or more computer processor(s) (902), non-persistent storage device(s) (904) (e.g., volatile memory, such as random access memory (RAM), cache memory), persistent storage device(s) (906) (e.g., a hard disk, an optical drive such as a compact disk (CD) drive or digital versatile disk (DVD) drive, a flash memory, etc.), a communication interface (908) (e.g., Bluetooth interface, infrared interface, network interface, optical interface, etc.), and numerous other elements and functionalities that implement the features and elements of the disclosure.

The computer processor(s) (902) may be an integrated circuit for processing instructions. For example, the computer processor(s) (902) may be one or more cores or micro-cores of a processor. The computing system (900) may also include one or more input device(s) (910), such as a touchscreen, a keyboard, a mouse, a microphone, a touchpad, an electronic pen, or any other type of input device.

The communication interface (908) may include an integrated circuit for connecting the computing system (900) to a network (not shown) (e.g., a local area network (LAN), a wide area network (WAN) such as the Internet, a mobile network, or any other type of network) and/or to another device, such as another computing device.

Further, the computing system (900) may include one or more output device(s) (912), such as a screen (e.g., a liquid crystal display (LCD), a plasma display, a touchscreen, a cathode ray tube (CRT) monitor, a projector, or other display devices), a printer, external storage, or any other output device. One or more of the output device(s) (912) may be the same or different from the input device(s) (910). The input and output device(s) (910 and 912) may be locally or remotely connected to the computer processor(s) (902), the non-persistent storage device(s) (904), and the persistent storage device(s) (906). Many different types of computing systems exist, and the aforementioned input and output device(s) (910 and 912) may take other forms.

Software instructions in the form of computer-readable program code to perform the one or more embodiments may be stored, in whole or in part, temporarily or permanently, on a non-transitory computer-readable medium such as a CD, a DVD, a storage device, a diskette, a tape, flash memory, physical memory, or any other computer-readable storage medium. Specifically, the software instructions may correspond to computer-readable program code that, when executed by a processor(s), is configured to perform the one or more embodiments.

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system (900) shown in FIG. 9A, or as a group of nodes combined may correspond to the computing system (900) shown in FIG. 9A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (900) may be located at a remote location and connected to the other elements over a network.

Although not shown in FIG. 9B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system (900) shown in FIG. 9A. Further, the client device (926) may include and/or perform all or a portion of the one or more embodiments.

The computing system (900) or group of computing systems described in FIGS. 9A and 9B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the one or more embodiments, may extract one or more data items from the obtained data. For example, the extraction may be performed as follows by the computing system (900) in FIG. 9A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (900) of FIG. 9A, while performing the one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (900) in FIG. 9A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create a statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference, or index a file for read, write, deletion, or any combination thereof, for responding to the statement. The DBMS may load the data from persistent or non-persistent storage and perform computations to respond to the query. The DBMS may return the result(s) to the user or software application.

The computing system (900) of FIG. 9A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computing device with a predefined duration and intensity of the vibration to communicate the data.

The above description of functions presents only a few examples of functions performed by the computing system (900) of FIG. 9A and the nodes (e.g., node X (922), node Y (924)) and/or client device (926) in FIG. 9B. Other functions may be performed using one or more embodiments.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a computer or a computer-executed instruction, refers to a computer engineering tolerance anticipated or determined by a computer scientist or computer technician of ordinary skill in the art. The exact quantified degree of an engineering tolerance depends on the software and/or hardware in use and the technical property being measured. For a non-limiting example, two processes may be "about" concurrent when one process is executed within a pre-defined number of processor operations of the other process. In another non-limiting example in which an algorithm compares a first property to a second property, the first property may be "about" equal to the second property when the two properties are within a pre-determined range of measurement. Engineering tolerances could be loosened in other embodiments; i.e., outside of the above-mentioned pre-determined range in one embodiment, but inside another pre-determined range in another embodiment. In any case, the ordinary artisan is capable of assessing what is an acceptable engineering tolerance for a particular algorithm, process, or hardware arrangement, and thus is capable of assessing how to determine the variance of measurement contemplated by the term "about."

As used herein, the terms "connected to" or "in communication with" contemplate multiple meanings. A connection or communication may be direct or indirect. For example, computer A may be directly connected to, or communicate with, computer B by means of a direct communication link. Computer A may be indirectly connected to, or communicate with, computer B by means of a common network environment to which both computers are connected. A connection or communication may be wired or wireless. A or connection or communication may be temporary, permanent, or semi-permanent communication channel between two entities.

As used herein, an entity is an electronic device, not necessarily limited to a computer. Thus, an entity may be a mobile phone, a smartwatch, a laptop computer, a desktop computer, a server computer, etc. As used herein, the term "computer" is synonymous with the word "entity," unless stated otherwise.

While the one or more embodiments have been described with respect to a limited number of embodiments, those skilled in the art, having the benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A method comprising:
    receiving a command to display a modal dialog on a display screen of a device, wherein:
        the display screen is programmed to display the modal dialog using both a first scrolling frame and a second scrolling frame,
        the first scrolling frame permits scrolling of the modal dialog when a modal dialog height exceeds a first scrolling frame constraint of the first scrolling frame,
        the second scrolling frame permits scrolling of a content section of the modal dialog when a content section height exceeds a second scrolling frame constraint of the second scrolling frame, and
        the first scrolling frame constraint has a first priority and a second priority,
    determining a physical orientation of the display screen as being either in a portrait orientation or a landscape orientation;
    assigning, responsive to determining the physical orientation, an applicable priority that is applicable to the first scrolling frame constraint, wherein the applicable priority comprises the first priority in the portrait orientation, and comprises the second priority in the landscape orientation; and
    displaying, after assigning the applicable priority, the modal dialog on the display screen.

2. The method of claim 1, wherein the second scrolling frame is nested with respect to the first scrolling frame.

3. The method of claim 1, wherein:
    the physical orientation is in the landscape orientation,
    the applicable priority comprises the second priority, and
    displaying comprises:
        expanding a height of the content section to the first scrolling frame constraint, and responsive to the height of the modal dialog exceeding the first scrolling frame constraint, permitting scrolling of an entirety of the modal dialog.

4. The method of claim 1, wherein:
    the physical orientation is in the portrait orientation,
    the applicable priority comprises the first priority, and
    displaying comprises:
        expanding a height of the content section to a minimum of 1) an available space and 2) the second scrolling frame constraint, and
        responsive to the height of the content section exceeding the second scrolling frame constraint, permitting scrolling of the content section.

5. The method of claim 4, wherein displaying further comprises:
    displaying at least one additional section of the modal dialog on a frozen area of the display screen.

6. The method of claim 1, wherein the applicable priority controls which of the first scrolling frame and the second scrolling frame controls a scrolling behavior of the modal dialog.

7. The method of claim 6, wherein, in the landscape orientation, the first scrolling frame constraint controls the scrolling behavior, and the scrolling behavior comprises:
    permitting scrolling of the modal dialog.

8. The method of claim 6, wherein, in the portrait orientation, the second scrolling frame controls the scrolling behavior, and the scrolling behavior comprises:
    permitting scrolling of the content section of the modal dialog, and
    freezing, on the display screen, a first section of the modal dialog, the first section being different than the content section.

9. The method of claim 8, wherein the scrolling behavior further comprises:
    freezing, on the display screen, a second section of the modal dialog, the second section being different than both the first section and the content section,
    wherein the first section is displayed above the content section, and
    wherein the second section is displayed below the content section.

10. The method of claim 9, wherein permitting scrolling of the modal dialog comprises permitting scrolling of an entirety of the modal dialog, including both the content section and the first section of the modal dialog.

11. A system comprising:
a display screen;
a data repository connected to the display screen and storing:
  a modal dialog displayable on the display screen, the modal dialog having a modal dialog height, and the modal dialog further comprising a first section and a content section having a content section height,
  a first scrolling frame defined for the modal dialog and defining a first scrolling behavior of the modal dialog,
  a second scrolling frame defined for the modal dialog and defining a second scrolling behavior of the modal dialog,
  a first constraint defined for the first scrolling frame,
  a second constraint defined for the second scrolling frame,
  a first priority and a second priority assignable to the first constraint,
  an applicable priority comprising one of the first priority and the second priority, and
  a determination of whether the display screen is in a portrait orientation or in a landscape orientation; and
a controller connected to the data repository and configured to perform, in response to receiving a command to display the modal dialog:
  generating the determination of whether the display screen is in the portrait orientation or in the landscape orientation,
  assigning, based on the determination, one of the first priority and the second priority as the applicable priority, and
  displaying, on the display screen, the modal dialog.

12. The system of claim 11, wherein:
the determination comprises the display screen being in the landscape orientation, and
assigning comprises assigning the second priority as the applicable priority.

13. The system of claim 12, wherein:
a total height of the modal dialog exceeds the first constraint, and
the first scrolling behavior comprises permitting scrolling of an entirety of the modal dialog on the display screen.

14. The system of claim 11, wherein the first scrolling frame is nested with respect to the second scrolling frame.

15. The system of claim 11, wherein:
the determination comprises the display screen being in the portrait orientation, and
assigning comprises assigning the first priority as the applicable priority.

16. The system of claim 15, wherein:
a height of the content section exceeds the second constraint, and
the second scrolling behavior comprises permitting scrolling of the content section of the modal dialog in a first sub-area of the display screen, while the first section of the modal dialog remains frozen in a second sub-area of the display screen.

17. A method of programmatically controlling a modal dialog when the modal dialog is displayed on a display screen of a device, comprising:
establishing a first scrolling frame for the modal dialog, the first scrolling frame having a first constraint and defining a first scrolling behavior of the modal dialog;
establishing a second scrolling frame for the modal dialog, the second scrolling frame having a second constraint and defining a second scrolling behavior of the modal dialog, wherein the second scrolling frame is nested with respect to the first scrolling frame;
establishing a first priority for the first constraint when the display screen is in a portrait orientation;
establishing a second priority for the first constraint when the display screen is in a landscape orientation;
programmatically generating a command to change an applicable priority of the first constraint between the first priority and the second priority, responsive to detection of a change in orientation of the display screen between the portrait orientation and the landscape orientation; and
displaying, according to the command, the modal dialog on the display screen of the device, wherein the first scrolling behavior and the second scrolling behavior control display of the modal dialog.

18. The method of claim 17, wherein, when the display screen is in the portrait orientation, the first priority is the applicable priority, such that the second constraint of the second scrolling frame controls display of the modal dialog, and the second scrolling behavior applies to the display of the modal dialog.

19. The method of claim 17, wherein, when the display screen is in the landscape orientation, the second priority is the applicable priority, such that the first constraint of the first scrolling frame controls display of the modal dialog, and the first scrolling behavior applies to the display of the modal dialog.

20. The method of claim 17, wherein the command forces a second change between the first scrolling behavior and the second scrolling behavior.

\* \* \* \* \*